United States Patent Office 2,808,386
Patented Oct. 1, 1957

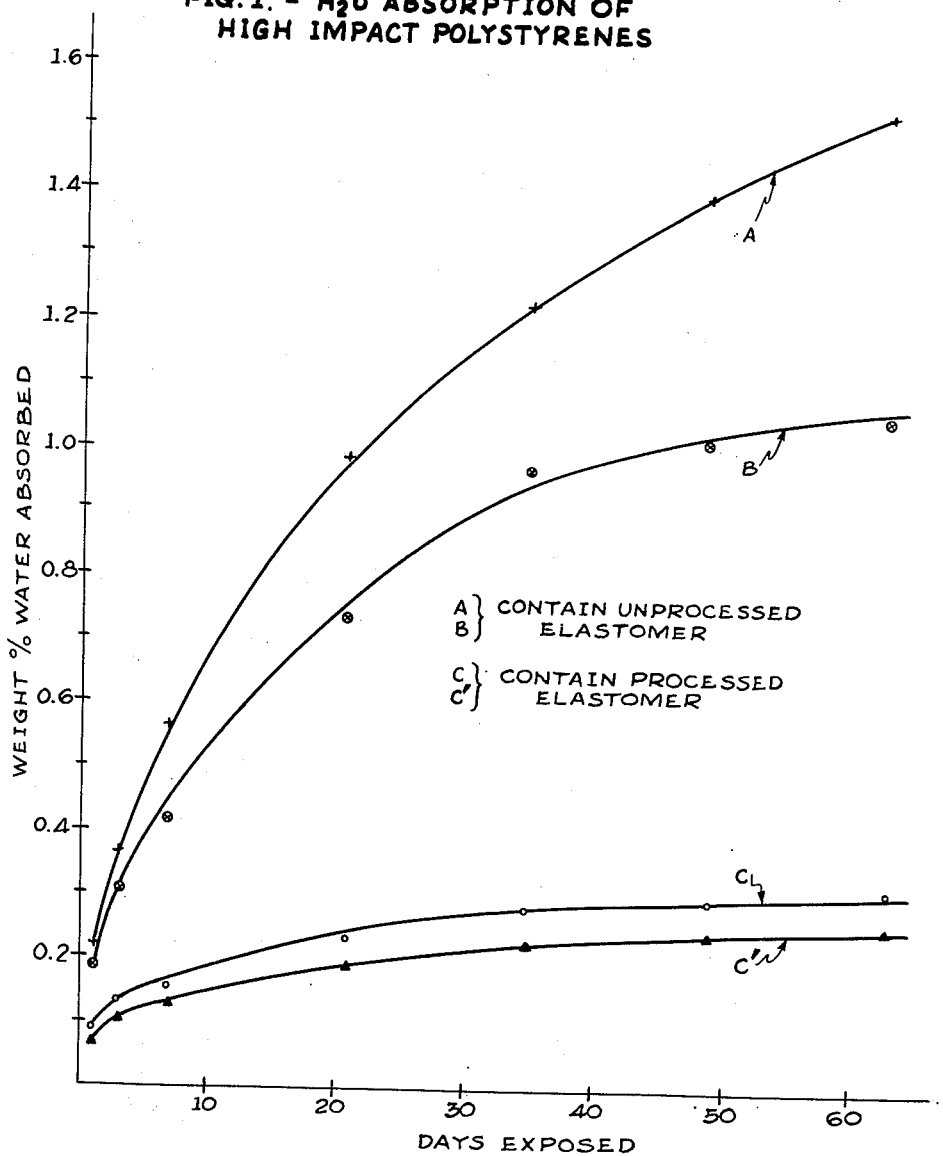

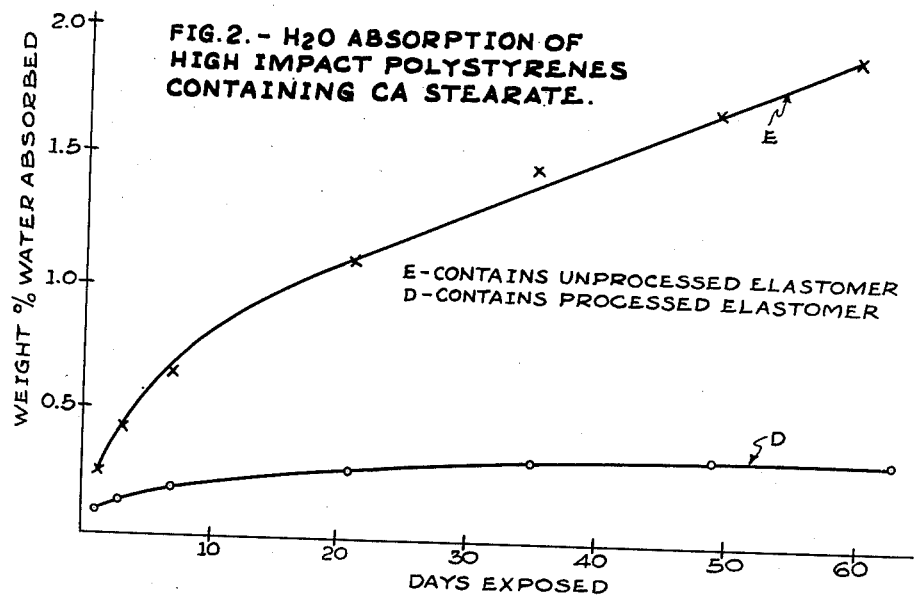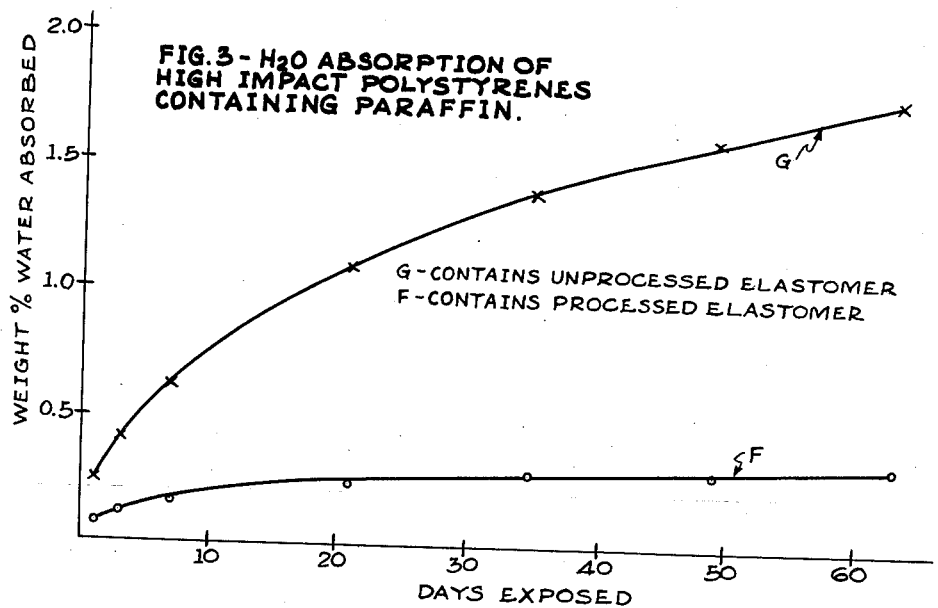

2,808,386

LOW-WATER ABSORPTION HIGH-IMPACT POLYSTYRENE MOLDING COMPOSITIONS

Gaetano F. D'Alelio, Pittsburgh, Pa., assignor to Koppers Company, Inc., a corporation of Delaware Application April 11, 1952, Serial No. 281,883

13 Claims. (Cl. 260—41.5)

This invention is concerned with certain new thermoplastic molding compositions. It is more particularly concerned with homogeneous mixtures of high molecular weight polystyrene (hereafter referred to as "polystyrene") with elastomers, that is, rubbery-like copolymers, which, when molded, produce compositions exhibiting unexpectedly low-water and water-vapor absorption properties. The invention is particularly concerned with compositions containing elastomers comprising the copolymerizate of from 50–90% conjugated aliphatic olefin containing from 3 to 8 carbon atoms and a vinyl aromatic compound. The invention is more particularly concerned with mixtures of polystyrene and elastomers comprising styrene and butadiene-1,3.

It is known in the art that the physical properties, such as impact resistance, of polystyrene are improved by the admixture with polystyrene of from approximately one-tenth to one-third its weight of an elastomer comprising, for example, a copolymer of a vinyl aromatic compound and an open chain conjugated diolefin. Elastomers such as those derived from the copolymerization of butadiene-1,3 and styrene are particularly useful in increasing the impact strength of polystyrene. However, although these compositions possess high impact strength and relatively low-water absorption properties, the amounts of water or water-vapor they absorb are objectionable for certain applications. For example, absorption of water in moldings for electrical use can cause undesirable diminution of dielectric properties and characteristics. These difficulties are overcome by the compositions embraced by this invention.

It has now been discovered that use of from approximately 5% to 33% by weight an elastomer which is substantially free of materials usually contaminating rubbery copolymers prepared by emulsion polymerization (that is, fatty acid soap or rosin soap emulsifiers, coagulants, electrolytes, etc.), in combination with polystyrene yields molding compositions from which can be produced molded articles possessing unexpectedly low-water or water-vapor properties. It will be realized that this invention embraces the use of elastomers prepared by methods other than emulsion polymerization, for example, suspension, solution or mass polymerization. The criterion of acceptability is substantial freedom from the materials (broadly denominated water-soluble contaminants) usually found in elastomers produced by emulsion polymerization. That is, materials which are removed by the straining and milling processes (or their equivalents) usually employed in the production of "SP" types of GR–S rubbers. Hereafter these elastomers will be referred to as "processed elastomers."

Polystyrene ordinarily useful for molding or for incorporation into molding compositions may be used in the composition embraced herein. It has been found that crystal grade polystyrene, and in particular crystal grade polystyrene bead obtained by suspension polymerization, is particularly useful and is preferred.

The enhanced low-water absorption properties of high impact polystyrenes containing processed elastomers are illustrated in Figure 1. In that figure, curves A and B show the water absorption of polystyrenes containing unprocessed elastomers (specifically ordinary GR–S rubbers) while curves C and C' show the water absorption of polystyrenes containing a processed elastomer (specifically GR–S–SP rubbers). As can be seen from Figure 1, after one day's exposure to water, a polystyrene composition containing an unprocessed styrene-butadiene-divinylbenzene elastomer (B) absorbs approximately twice as much water as the polystyrene composition containing the same elastomer which is substantially free of water-soluble contaminants (C or C'). As the period of exposure is increased to, for example, 60 days, the composition containing the unprocessed elastomer absorbs approximately threee or four times the amount of water absorbed by the composition containing the processed elastomer. In general, any elastomer comprising styrene and butadiene which is substantially free of water-soluble contaminants is suitable for admixture with polystyrene to produce molding compositions embraced by the invention. Broadly, elastomers obtained by copolymerization of mixtures of from 50 to 90% conjugated aliphatic diolefin and a vinyl aromatic compound are useful. The addition of small quantities of divinyl aromatic, for example, 0.5% divinylbenzene, to the above composition yields elastomers which give desirable properties. It has been discovered that the synthetic rubbers, designated in the current publications of the Office of Rubber Reserve as GR–S-numeral-SP, for example, GR–S–60SP, GR–S–65SP, GR–S–66SP and the like, are particularly useful. These elastomers differ from ordinary GR–S rubbers in that they have been strained and milled after drying which improves processability and reduces electrolyte content.

These processed elastomers may be admixed with polystyrene in amounts of from approximately 5 to 33% of the weight of polystyrene to yield compositions having low-water or water-vapor absorption characteristics. Compositions containing from approximately 8 to 20% of the processed elastomers are particularly useful. The compositions containing polystyrene and from approximately 8 to 14% processed elastomer are preferred wherein the elastomer consists of the copolymerizate of a mixture of 71% butadiene, 28.5% styrene and 0.5% divinylbenzene.

The compositions possessing heretofore unknown low-water or water-vapor absorption characteristics can be obtained by admixing polystyrene with processed elastomer by any usual method. For example, polystyrene and processed elastomer can be introduced into a Banbury mill, milled for a period of time, for example, six minutes, under such conditions that the maximum temperature reached is such that degradation of the elastomer does not occur. The material from the Banbury mill can be sheeted on a holding mill, cut and removed therefrom, chopped or extruded into pellets. Such materials as plasticizers, pigments, dyes, fillers, and the like can be incorporated in the usual manner.

These compositions have utility in applications where low-water or water-vapor absorption characteristics are important. For example, the compositions can be used to produce molded parts useful in electronics or communication equipment, radio, television, and the like.

The invention is illustrated by, but not necessarily restricted to, the following specific examples.

EXAMPLE I

Compositions as set out below were prepared by introducing crystal grade polystyrene and elastomer into a Banbury mill, mixing for approximately six minutes at a maximum temperature of approximately 400° F., sheeting the mix on a holding mill, chopping or extruding strips of said sheet and injection molding of the composition.

| Sample | Polystyrene, percent | Elastomer |
|---|---|---|
| A | 86 | 14% (GR-S-26): (71% butadiene, 29% styrene). |
| B | 88 | 12% (GR-S-60): (71% butadiene, 28.5% styrene, 0.5% divinylbenzene). |
| C | 88 | 12% (GR-S-60SP): (71% butadiene, 28.5% styrene, 0.5% divinylbenzene). |
| C' | 92 | 8% (GR-S-60SP): (71% butadiene, 28.5% styrene, 0.5% divinylbenzene). |

Samples of the molded materials were tested for water absorption by the general procedure outlined by A. S. T. M. designation D570–42 except that exposure was continued for a considerable period of time beyond the prescribed 24-hour period. The results of these tests are set out in Table I.

*Table I*

| Exposure Time in Days | Weight Percent Water Absorbed by Sample | | | |
|---|---|---|---|---|
| | A | B | C | C' |
| 1 | 0.223 | 0.191 | 0.090 | 0.074 |
| 3 | 0.376 | 0.314 | 0.132 | 0.106 |
| 7 | 0.564 | 0.420 | 0.153 | 0.130 |
| 21 | 0.989 | 0.735 | 0.239 | 0.188 |
| 35 | 1.228 | 0.914 | 0.281 | 0.221 |
| 49 | 1.399 | 1.032 | 0.293 | 0.240 |
| 63 | 1.526 | 1.121 | 0.314 | 0.247 |

These data illustrate the water absorption of two compositions (A and B) containing unprocessed elastomer comprising butadiene and styrene and two compositions (C and C') containing processed elastomer comprising butadiene and styrene. It is to be noted that the elastomers incorporated in B, C and C' contain 0.5% divinylbenzene. The data are plotted in Figure 1 which illustrates the unexpectedly low-water absorption of high impact polystyrene containing a processed elastomer.

EXAMPLE II

The below set out compositions were prepared according to the procedure outlined in Example I. The 0.25% calcium stearate was introduced into the Banbury mill with the polystyrene and the elastomer.

| Sample | Polystyrene, percent | Ca Stearate, percent | Elastomer |
|---|---|---|---|
| D | 85.75 | 0.25 | 14% (GR-S-66SP): (71% butadiene, 29% styrene). |
| E | 85.75 | 0.25 | 14% (GR-S-26): (71% butadiene, 29% styrene). |

Samples of the molded materials were tested for water absorption according to the procedure set out in Example I. The results are given in Table II and are plotted in Figure 2. Figure 2 illustrates the fact that the inclusion of a mold lubricant such as calcium stearate does not change the relation of the water absorptive properties of high impact polystyrenes containing processed and unprocessed elastomers.

*Table II*

| Exposure Time in Days | Weight Percent Water Absorbed by Sample | |
|---|---|---|
| | D | E |
| 1 | 0.091 | 0.245 |
| 3 | 0.125 | 0.414 |
| 7 | 0.167 | 0.639 |
| 21 | 0.255 | 1.074 |
| 35 | 0.300 | 1.440 |
| 49 | 0.315 | 1.664 |
| 63 | 0.323 | 1.826 |

EXAMPLE III

Compositions as set out below were prepared according to the procedure outlined in Example I. The 0.5% paraffin was introduced into the Banbury mill with the polystyrene and elastomer.

| Sample | Polystyrene, Percent | Paraffin, Percent | Elastomer |
|---|---|---|---|
| F | 85.5 | 0.5 | 14% (GR-S-66SP): (71% butadiene, 29% styrene). |
| G | 85.5 | 0.5 | 14% (GR-S-26): (71% butadiene, 29% styrene). |

Samples of the molded materials were tested for water absorption as outlined in Example I. The data are set out in Table III and are plotted in Figure 3 which illustrates the fact that the inclusion of an additive or a modified such as paraffin does not change the relation of the water absorptive properties of polystyrenes containing processed and unprocessed elastomers.

*Table III*

| Exposure Time in Days | Weight Percent Water Absorbed by Sample | |
|---|---|---|
| | F | G |
| 1 | 0.082 | 0.243 |
| 3 | 0.115 | 0.402 |
| 7 | 0.155 | 0.606 |
| 21 | 0.244 | 1.093 |
| 35 | 0.279 | 1.392 |
| 49 | 0.299 | 1.531 |
| 63 | 0.315 | 1.737 |

EXAMPLE IV

The below set out compositions were prepared as outlined in Example I. The various additives were introduced into the Banbury mill together with the polystyrene and elastomer.

| Sample | Polystyrene, percent | Elastomer | Additive |
|---|---|---|---|
| H | 85.875 | 14% (GR-S-65SP): (71% butadiene, 29% styrene). | 0.125% stearic acid. |
| I | 87 | 12% (GR-S-60SP): (71% butadiene, 28.5% styrene, 0.5% divinylbenzene). | 1% TiO₂. |
| J | 86 | 12% (GR-S-60SP): (71% butadiene, 28.5% styrene, 0.5% divinylbenzene). | 2% carbon black.[1] |

[1] Added as a dispersion of 35% bead channel black in polystyrene.

Samples of the molded materials were tested for water absorption as outlined in Example I. The results of these tests are set forth in Table IV.

| Exposure Time in Days | Weight Percent Water Absorbed by Sample | | |
|---|---|---|---|
| | H | I | J |
| 1 | 0.087 | 0.071 | 0.081 |
| 3 | 0.113 | | |
| 7 | 0.137 | 0.155 | 0.174 |
| 21 | 0.216 | 0.238 | 0.255 |
| 35 | 0.266 | 0.274 | 0.297 |
| 49 | 0.280 | | |
| 63 | 0.291 | | |

These data illustrate the fact that the low-water absorption properties of high impact polystyrene containing processed elastomers is retained even if there is added to the composition substances such as a pigment ($TiO_2$), a carbon black filler, or a lubricant (stearic acid). Similarly, the inclusion of a mold lubricant such as calcium stearate yields a composition in which the low-water absorption properties are retained.

The molded compositions embraced herein, that is, those containing from approximately 8 to 33% of processed elastomer, have notched Izod impact values of approximately 0.3 foot pound per inch or greater.

EXAMPLE V

Various molded samples were tested for water-vapor absorption by exposure at 120° F. in an atmosphere of 97–100% relative humidity for seven days. The weight percent increase was determined by weighting. The data are set out in Table V.

| Sample | Water Vapor Absorption Weight Percent |
|---|---|
| A | 1.105 |
| D [1] | 0.194 |
| E | 1.525 |
| F [1] | 0.198 |
| G | 1.126 |
| H [1] | 0.183 |
| I [1] | 0.183 |
| J [1] | 0.225 |

[1] Contains processed elastomer.

These data illustrate the fact that the high impact polystyrene compositions containing processed elastomer absorb markedly less water vapor than do the high impact polystyrene samples containing unprocessed elastomer.

It will be noted that the new compositions set out above absorb less than 0.25 weight percent water vapor on exposure for one week. Similarly, Examples I through IV demonstrate that these new compositions absorb less than 0.2 weight percent water on exposure for one week to A. S. T. M. designation D 570–42 test conditions.

While there are above disclosed but a limited number of embodiments of the invention, it is possible to produce still other embodiments without departing from the inventive concept herein disclosed, and it is therefore, desired that only such limitations be imposed upon the appended claims as are stated therein or required by the prior art.

I claim:
1. A molding composition comprising 67 to 95 percent high molecular weight polystyrene and from approximately 5 to 33 percent of an elastomer consisting of a copolymerizate of 71% butadiene-1,3, 28.5% styrene and 0.5% divinylbenzene, said elastomer being free of water-soluble contaminants.
2. A molding composition comprising 86 to 92 percent high molecular weight polystyrene and from approximately 8 to 14 percent of an elastomer consisting of a copolymerizate of 71% butadiene-1,3, 28.5% styrene and 0.5% divinylbenzene, said elastomer being free of water-soluble contaminants.
3. A molding composition comprising 67 to 88% high molecular weight polystyrene and approximately 12 percent of an elastomer consisting of a copolymerizate of 71% butadiene-1,3, 28.5% styrene and 0.5% divinylbenzene, said elastomer being free of water-soluble contaminants.
4. A molding composition comprising 67 to 92% high molecular weight polystyrene and approximately 8 percent of an elastomer consisting of a copolymerizate of 71% butadiene-1,3, 28.5% styrene and 0.5% divinylbenzene, said elastomer being free of water-soluble contaminants.
5. A molding composition consisting of 88 percent high molecular weight polystyrene and 12 percent elastomer, said elastomer being the copolymerizate of a mixture of 71% butadiene-1,3, 28.5% styrene and 0.5% divinylbenzene, said elastomer being free of water-soluble contaminants.
6. A molding composition consisting of 86 percent high molecular weight polystyrene, 2 percent bead channel black and 12 percent of an elastomer, said elastomer being the copolymerizate of a mixture of 71% butadiene-1,3, 28.5% styrene and 0.5% divinylbenzene, said elastomer being essentially free of water-soluble contaminants.
7. A molding composition comprising 67 to 95% high molecular weight polystyrene and from 5 to 33% of an elastomer consisting of a copolymerizate of from 50 to 90% butadiene-1,3 and 10 to 50% of a mixture consisting of styrene and up to 0.5% divinylbenzene, said elastomer being free of water-soluble contaminants.
8. A heat hardened, molded composition of claim 1.
9. A heat hardened, molded composition of claim 2.
10. A heat hardened, molded composition of claim 3.
11. A heat hardened, molded composition of claim 4.
12. A heat hardened, molded composition of claim 5.
13. A heat hardened, molded composition of claim 6.

References Cited in the file of this patent

UNITED STATES PATENTS

| | | |
|---|---|---|
| 2,474,807 | Schoene | July 5, 1949 |
| 2,574,439 | Seymour | Nov. 6, 1951 |
| 2,578,518 | Ditz et al. | Dec. 11, 1951 |
| 2,616,864 | Donaldson et al. | Nov. 4, 1952 |
| 2,623,863 | Dieckmann et al. | Dec. 30, 1952 |
| 2,624,683 | Bezman | Jan. 6, 1953 |
| 2,681,898 | Daly | June 22, 1954 |

FOREIGN PATENTS

| | | |
|---|---|---|
| 644,022 | Great Britain | Oct. 4, 1950 |